United States Patent Office 2,903,928
Patented Sept. 15, 1959

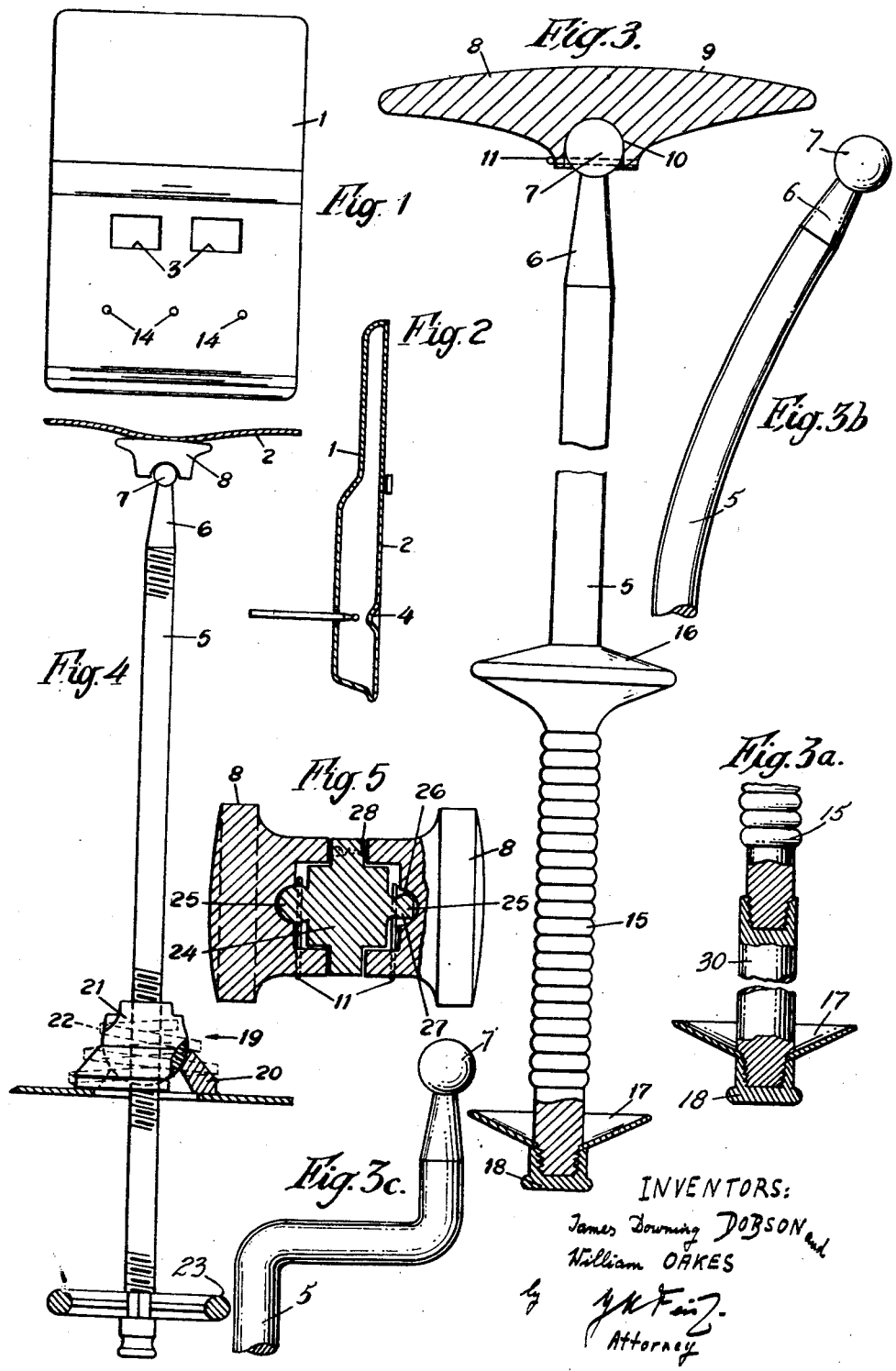

2,903,928

DENT REMOVING TOOL AND METHOD OF ITS USE

James Downing Dobson and William Oakes, London, England

Application October 11, 1956, Serial No. 615,288

Claims priority, application Great Britain October 14, 1955

9 Claims. (Cl. 81—15)

This invention relates to panel beating and to panel beating tools.

In panel beating use is frequently made of a dolly, i.e., a heavy shaped block adapted to be grasped in the hand and pressed against one side of the panel at the deformed region to form an anvil against which the panel may be hammered.

Such a procedure gives rise to no difficulties if the panel is freely exposed on both sides. Often, however, a deformed panel has to be beaten which forms part of a hollow structure. For example, it may be the outer panel of a vehicle door or other box-like unit, and in such cases the operation is not so straightforward unless the panel deformation chances to be near to an aperture in the structure sufficiently large to admit the dolly and enable it to be brought into position for convenient use in the aforesaid manner. If the deformation is not so accessible the panel beater may use a spoon, i.e., a tool comprising an anvil-forming head with a handle whereby, after passing the tool through an opening in the structure, the head may be pressed against a deformed region not near enough to the opening to be conveniently reached by the hand during the panel beating operation, but it is sometimes difficult to maintain in this way the necessary supporting pressure against a panel during hammering. Sometimes, in order to permit a dolly to be directly pressed or hammered against the inside face of the deformed region, the panel beater cuts the wall of the structure opposite the deformation to provide an opening large enough to pass a dolly, but restoration of the cut panel is not always easy particularly if it is formed of a material which cannot or cannot easily be welded.

With the foregoing difficulties in mind, the present invention aims to provide improvements which will simplify certain panel beating operations.

According to the invention there is provided a method of restoring or partly restoring a deformed panel which forms part of a hollow structure and has a deformity at a point which is concealed on the inside by an opposite wall, wherein a tool is used comprising a head adapted to serve as an anvil during a panel beating operation and a detachable shaft-like handle adapted at one end to be readily coupled to and uncoupled from the head, the deformity at the said point being removed by the steps of forming in the opposite wall a hole large enough to pass the end portion of the handle which connects with the head, at a point such that the handle can reach the region of the deformity by way of the hole, bringing the said end portion of the handle and the head together within the structure by passing the said end portion of the handle through the said hole and passing the head through another opening already present or formed for that purpose, connecting the head and handle within the structure, and beating the panel at the said point using the head of the said tool as a hammer and/or anvil on the inside of the panel, the head being controlled through the part of the handle projecting externally of the structure.

In carrying out this method it is only necessary to form a comparatively small hole for the tool handle and this small hole can be readily closed after the panel beating operation, e.g., by plugging.

In hollow structures to which panel beating operations have to be applied it is often the case that there is already one or more apertures large enough to enable a dolly to be passed into the interior. Thus, e.g., in the case of a door-section of a vehicle body the inside panel is usually apertured to give access for the internal attachment of fittings such as handle fittings. Although such an aperture will not permit a conventional dolly to be conveniently employed for a panel beating operation unless the aperture happens to be opposite or near to the deformation, in carrying out the present invention such an aperture may well enable the tool head to be brought into position for connecting to the handle and so obviate any necessity for an aperture to be formed specifically for this purpose. If it should be necessary in any particular case to form an aperture to pass the tool head, this aperture can be formed at any point which permits the head to be passed into the structure and coupled with the handle while this extends through the hole formed for it, and the panel beater accordingly has a certain freedom to select the position of the aperture so as to facilitate as much as possible the eventual task of concealing or closing it.

The head of the tool employed in the new method may have any desired shape, and a kit of tools may comprise a number of heads of different shapes to enable a head most appropriate to a particular operation to be selected.

Particularly in cases where the deformity is very localised and the hole for passing the tool handle is formed directly opposite the deformity, the head and handle of the tool may couple together so that they are not relatively movable while coupled, but it is preferred to provide an articular connection between the shaft and the head so that the head can rock, preferably in every direction, relatively to the handle, and the invention includes as a new article of manufacture, a panel beater's tool comprising a head component, adapted to form an anvil during a trimming or other beating operating and a shaft-like handle, the head component and one end of the handle being constructed so that they can be readily coupled and uncoupled for carrying out the new method and so that when coupled the block can articulate relatively to the handle.

When using such a tool, while preserving correct presentation of the working face of the head to the panel to be beaten, the head may be moved from one working position to another within a small area of the panel by altering the angle at which the handle passes through the hole in the opposite wall.

The handle of the tool may be straight or it may be formed as with a crank or a curvature, with a view to enlarging the distance at which the hole for the shaft can be offset from the point of deformity to be corrected. If a kit of tools comprises both a straight and one or more angled shafts, the angled shafts may, e.g., be used in cases where it is not convenient to form a hole for the shaft as near to the point of deformity to be corrected as would be required when using a straight shaft.

The tool may comprise a nut which can be positioned along the handle so that it may be brought to bear against the inside face of the wall through which the handle is passed and so that by then changing the length of the handle the tool head is forced against the deformity and the said part transmits the thrust to the said wall.

These and other features will be described in detail with reference to the accompanying drawings which illustrate embodiments of the invention by way of example only.

In the drawings, Figs. 1 and 2 show a box like section of a car body in rear elevation and side sectional elevation respectively. Fig. 3 is an elevation, partly in section, of a tool according to the invention. Figs. 3a, 3b and 3c show modified handle components. Fig. 4 shows another tool according to the invention having a thrust member for transmitting thrust to a wall through which the tool handle extends during panel beating. Fig. 5 shows a dolly tool comprising two detachable head components.

The car body section (Figs. 1 and 2) comprises an inner panel 1 and an outer panel 2. The inner panel is formed with apertures 3 to give access to lock and other fittings (not shown). For beating the outer panel to remove a dent 4 a tool comprising a head component adapted to serve as an anvil and a detachable shaft-like handle is employed.

One such tool is shown in Fig. 3. The handle 5 is in the form of a straight shaft which tapers at 6 towards one end and terminates in a ball 7. The head of the tool 8 which is adapted to form an anvil during the panel beating operation has a slightly convex face 9 for presenting to the panel and in the rear face of the head there is a part spherical socket 10 into which the ball 7 of the handle can be inserted and held by a U-shaped spring steel clip 11 which passes through holes in the wall of the socket, its limbs being presented chordally to the ball entering the socket so that as the head and handle are forced together to couple them the ball 7 spreads the limbs of the clip 11 elastically apart until they snap beind the ball as it seats in the socket 10. The two parallel limbs of the U-shaped clip, each passing through opposed holes in the socket portion of the head, engage on a chord of the ball so as to hold the latter in the socket and so as to permit the ball to be snapped past the clip out of the socket by a simple separating movement between the shaft and the head.

For removing the dent 4, one or more holes 14, depending on the form of the dent, each of a size sufficient to pass the shaft-like handle 5 of the tool, are drilled in the inner panel 1. If the dent is confined to one point of the outer panel it is sufficient to drill one hole 14. If the dent is regarded as extending widthwise across the panel then a number of holes are drilled at intervals along the course of the dent. The handle is passed through the hole or one of the holes 14, the head 8 is inserted through one of the apertures 3 in the inner panel, passed into the space between the inner and outer panels and coupled to the ball end of the handle. The handle projects externally of the section and by grasping this projecting part of the handle and by pushing or hammering the head 8 against the inside of the panel 2 the dent is first raised to beyond its original contour. The panel beater or his assistant then thrusts against the handle to force the head 8 powerfully against the inside of panel 2 so that it serves as an anvil for the shrinking and trimming operation in which the panel 2 is hammered on its outer face. The ball joint permits the head to rock with reference to the handle so that while the handle is in one hole 14 the head can be moved over a certain area of the outer panel. Assuming the dent 4 to extend widthwise of the outer panel, the head is moved along the dent as far as possible while the handle is in one of the holes 14. The head is then uncoupled from the handle and connected to it again with the handle passed through the next hole 14 so that a next part of the dent can be removed. When the work has been completed the small holes 14 may be readily plugged, e.g., with rubber plugs.

In the tool shown in Fig. 3 a grip portion 15 is defined between a forward enlargement 16 against which the hand may be pressed for imparting forward thrust to the tool and a rearward shield 17 designed to protect the hand should it be desired, e.g., in raising a dent as before referred to, to direct hammer blows onto the free end of the handle. The shield is secured by a nut 18 secured on a threaded end of the handle and if desired the nut and shield may be removed to permit an extension 30 (Fig. 3a) of the handle to be screwed onto the screw spigot of the main handle the shield then being fixed if desired onto the extension. The nut 18 may take a suitable bearing to prevent damage to the screw thread.

It will be observed that the extension of the tool handle through a relatively small hole in the inner panel enables the tool in some cases to remain supported even in the event that grip of the handle has temporarily to be relaxed so that the tool does not have to be laid down and then taken up again, e.g., when "shrinking." It will also be seen that as compared with the use of a conventional dolly, when using a tool as shown in the way described there will be fewer circumstances in which a second person has to be employed to manipulate the "anvil" and more occasions when the panel beater may himself control both the anvil and the hammer, e.g., during trimming and shrinking. The advantages of this in obtaining the "feel" of the anvil during hammering will be well appreciated. Moreover when raising a dent by means of the tool the head may be thrust powerfully against the panel in a direction perpendicular to the general pla e of the panel and the tool head does not need to be as heavy as a dolly or spoon which requires to be swung in the panel beater's hand while he reaches into the interior of the section from an aperture, often well removed from the working point. Thus the tool can be used effectively in a more confined interior space between the panels than conventional tools.

The shaft handle need not be straight, but may be curved, e.g., as shown in Fig. 3b, or it may have a double reverse bend (Fig. 3c) forming a crank with the tapering end of the handle extending parallel with the hand grip portion, thus enabling the head to be pressed against an outer panel at a point offset with respect to the hole for the handle.

Reference is now made to Fig. 4 illustrating a tool embodying a thrust component for enabling a certain thrust of the tool head against the rear of the panel to be beaten to be exerted independently of the hand of the operator. This tool is basically the same as the tool shown in Fig. 3 and corresponding parts in the two figures are designated by like reference numerals. In the case of the tool shown in Fig. 4 the shaft of the tool is screw threaded along its length and a thrust member 19 engages around the shaft. This member comprises a cup-shaped member 20 with a flat rearward face and a part spherical seating face to the fore, and a threaded bushing 21 which is screwed onto the shaft 5 and has a part spherical rearward end face which seats in the spherical recess of the member 20. These separate parts are held together by an encircling spiral spring 22 which however permits the bushing to rock on its seating. For clarity the spring is indicated merely by a broken line. When using this tool, after inserting the end of the shaft 5 through a hole, such as one of the holes 14 in Fig. 1, and before attaching the tool head, the member 20 is passed through an opening 3 and is threaded onto the shaft. After attaching the tool head the member 21 is screwed along the shaft until the thrust member 20 is in bearing contact with the inner panel 1 with the curved anvil face of the tool head bearing against the outer panel 2. The projecting end of the tool handle has a hand-wheel 23 and by now turning this handle the shaft is screwed through the thrust member and the anvil is forced powerfully against the rear of the outer panel, the reaction thrust being taken by the rear panel 1. A thrust against the outer panel is thus built up by which for example a dent may be raised preparatory to a shrinking operation.

The tools illustrated may of course be usefully employed in ways other than that described. For example they may be used in the manner of a conventional spoon by placing the tool head against the interior face of the deformed panel at the required point with the shaft extending through an aperture in the opposite panel of the structure and maintaining the head thrust against the deformed panel by exerting a levering force on the projecting end of the handle so that the handle fulcrums on an edge of the aperture. In this case the articular connection between the head and handle will permit appropriate presentation of the tool head to the deformed panel irrespective of the precise angle of the shaft.

For further increasing the universality of the tool it may form part of a kit comprising different shaped heads and a short coupling component adapted to have a head coupled to it, preferably at each end, for forming a dolly adapted to be grasped in the hand. Such a tool is shown in part sectional elevation in Fig. 5. This tool comprises a short coupling component 24 with end spigots 25 each adapted as shown to enter a recess in a tool head 8 and to be retained by a U-shaped spring clip 11 passing through a wall of the said head. The illustrated tool embodies opposite couplings which differ in that the left-hand spigot is a part spherical ball adapted to expand the limbs of the clip 11 as the appertaining head is being coupled, as already described in referring to the tools shown in Figs. 3 and 4, while the right-hand spigot has opposite facets 26, 27 enabling it to be passed freely between the limbs of the clip 11 of the appertaining head and then to be locked behind the clip in the position shown by relatively rotating the coupling component and the head. This relative turning movement causes a spring-loaded ball 28 to enter into engagement with a recess in the appertaining head to hold the parts against inadvertent separation. As an alternative to the construction shown, the dolly heads may have spigots for engaging recesses in the coupling component.

A tool such as is shown in Fig. 5 is adapted to be grasped in the hand for pressing or banging either head against a panel and while it may as already stated be usefully employed as part of a tool kit providing one or more tools such as those shown in Figs. 3 and 4, particularly if the tool heads are adapted for coupling either to a shaft or to the hand coupling-component, a tool constructed in the general manner shown in Fig. 5 with one or two heads may be supplied and used alone and the invention accordingly includes a panel beaters dolly comprising a handle or coupling component and a head component detachably coupled or adapted to be so coupled to one or each end of the said component to form a hand grip dolly, the coupling or each coupling preferably permitting articulation of one or each head relatively to the said component about one or more axes.

The ball portions 25 are each secured in the corresponding socket by U-shaped spring clips 11 located in holes in the socket portions and engaging the ball portion on a chord, as previously described in connection with Fig. 3.

What we claim is:

1. A method of restoring or partly restoring a deformed panel which forms part of a hollow structure and has a deformity at a point which is concealed on the inside by an opposite wall, wherein a tool is used comprising a head adapted to serve as an anvil during a dent-removing operation and a detachable shaft-like handle adapted at one end to be readily coupled to and uncoupled from the head, the deformity at the said point being removed by the steps of forming in the opposite wall a hole large enough to pass the end portion of the handle which connects with the head, at a point such that the handle can reach the region of the deformity by way of the hole, bringing the said end portion of the handle and the head together within the structure by passing the said end portion of the handle through the said hole and passing the head through another opening already present or formed for that purpose, connecting the head and handle within the structure, and hammering the dent at the said point using the head of the said tool as a hammer or as an anvil on the inside of the panel, the head being controlled through the part of the handle projecting externally of the structure.

2. A method according to claim 1, wherein the panel is deformed over a certain area which cannot all be reached by the said tool while its handle extends through the said hole, and wherein one or more further holes for passing the handle are formed in the opposite wall to give access to other points of deformity and the deformed area is restored by repeating the method according to claim 1 with the tool handle extended through one or each said further hole.

3. A method according to claim 1, which includes the step of screwing the handle through a nut to thrust the tool-head against the deformed part of the panel whilst the nut reacts against the inside of the said opposite wall and can yield to enable the shaft to angle.

4. A dent-removing tool comprising a head component adapted to form an anvil during a beating operation and a shaft-like handle component, the head component and one end of the handle component being constructed for detachable articulated connection and means for so connecting them, said means permitting the head component to be easily manually assembled to and separated from the handle component in confined regions.

5. A dent-removing tool according to claim 4 in which the components engage in articulated connection by a ball and socket joint, the said connecting means being engageable with a spherical part of the ball to retain the ball joint engagement and to permit the parts to be released by a simple separating movement without detachment of the connecting means.

6. A dent-removing tool according to claim 5 in which the connecting means is a spring clip which is spread open in forcing the ball into the socket; then retains the ball-joint connection and allows the ball to be withdrawn from the socket by a simple separating movement of the handle and the head.

7. A dent-removing tool adapted to form an anvil and to be hammered against a panel to be straightened, the tool comprising a shaft-like handle component and a head component, said components being constructed for detachable articulated connection, means for so connecting them, said means permitting the head component to be manually assembled to and separated from the handle component in confined regions, the end of the shaft remote from the head-receiving end having a blunt end intended to be struck by a hammer and the shaft adjacent said remote end having a hand-grip.

8. A dent-removing tool according to claim 7 in which the hand grip is formed between two shields, one of said shields being adjacent to, and protecting the hand against hammer blows on, the blunt end of the shaft and the other serving as a stop member against which the user's hand can apply axial pressure to press the tool against the panel to be straightened.

9. A dent-removing tool according to claim 4 adapted to form an anvil and to be hammered against a panel to be straightened, said shaft component being insertable through a small hole in one panel, through which hole the head component cannot be passed, for subsequent assembly of the head component in articulated connection to the shaft component, for straightening another panel in spaced relation to the first panel, the end of the shaft component remote from the head-receiving end thereof having a blunt end intended to be struck by a hammer and to transmit the blow directly to the head component acting against the said panel to be straightened; the shaft component being screw-threaded and carrying a movable thrust means engaging the screw-threaded shaft component and adapted to thrust against the said panel with the small hole and forming a nut with respect to which the shaft can be axially moved to press the head against the panel to be straightened said nut permitting the shaft to be angled.

References Cited in the file of this patent

UNITED STATES PATENTS

| | | |
|---|---|---|
| 1,506,578 | Grandahl | Aug. 26, 1924 |
| 1,783,078 | Ferguson | Nov. 25, 1930 |
| 2,100,564 | Mandl et al. | Nov. 30, 1937 |
| 2,121,487 | Nichols | June 21, 1938 |
| 2,200,133 | Mandl | May 7, 1940 |
| 2,314,617 | Gambino | Mar. 23, 1943 |
| 2,485,489 | Ferguson | Oct. 18, 1949 |
| 2,491,295 | Anderson | Dec. 13, 1949 |
| 2,582,560 | Peterson et al. | Jan. 15, 1952 |
| 2,756,620 | Daniels | July 31, 1956 |
| 2,763,172 | Richards | Sept. 18, 1956 |

FOREIGN PATENTS

| | | |
|---|---|---|
| 485,190 | Canada | July 29, 1952 |